(12) United States Patent
You (10) Patent No.: US 10,829,123 B2
(45) Date of Patent: Nov. 10, 2020

(54) METHOD AND SYSTEM FOR DETERMINING WHETHER VEHICLE CAN ENTER ROAD

(71) Applicant: MANDO CORPORATION, Gyeonggi-do (KR)

(72) Inventor: HoJeong You, Seoul (KR)

(73) Assignee: MANDO CORPORATION, Pyeongtaek-si (KR)

( * ) Notice: Subject to any disclaimer, the term of this patent is extended or adjusted under 35 U.S.C. 154(b) by 28 days.

(21) Appl. No.: 16/043,130

(22) Filed: Jul. 23, 2018

(65) Prior Publication Data
US 2019/0031197 A1 Jan. 31, 2019

(30) Foreign Application Priority Data
Jul. 27, 2017 (KR) .......................... 10-2017-0095272

(51) Int. Cl.
*B60W 40/06* (2012.01)
*G06T 7/60* (2017.01)
(Continued)

(52) U.S. Cl.
CPC .............. *B60W 40/06* (2013.01); *B60R 1/00* (2013.01); *B60R 11/04* (2013.01); *G06K 9/00798* (2013.01); *G06K 9/00805* (2013.01); *G06T 7/60* (2013.01); *G06T 7/62* (2017.01); *B60R 2300/301* (2013.01); *B60R 2300/305* (2013.01); *B60R 2300/8066* (2013.01); *B60R 2300/8093* (2013.01); *B60W 2420/42* (2013.01); *B60W 2420/52* (2013.01);
(Continued)

(58) Field of Classification Search
CPC ............. B60W 40/06; B60W 2420/42; B60W 2420/52; G06T 7/62; B60R 1/00; B60R 11/04; B60R 2300/301; B60R 2300/8066; B60R 2300/8093; G06K 9/00798; G06K 9/00805
See application file for complete search history.

(56) References Cited

U.S. PATENT DOCUMENTS 9,134,732 B2   9/2015 Shin
2002/0183906 A1 * 12/2002 Ikeda ..................... G01C 21/32
                                                     701/36
(Continued)

FOREIGN PATENT DOCUMENTS

KR   10-2014-0142994 A   12/2014
KR      10-1632556 B1    6/2016

*Primary Examiner* — Mahmoud S Ismail
*Assistant Examiner* — Bakari Underwood
(74) *Attorney, Agent, or Firm* — Morgan, Lewis & Bockius LLP (57) ABSTRACT

A method for guiding a vehicle based on an open width of a roadway includes detecting a left road edge, a right road edge, an obstacle, and a free or open space on a the road ahead using an image sensor and radar installed so as to be oriented forwards in the vehicle. The width of the free/open space is determined at a plurality of positions over a predetermined distance from a front of the vehicle, and a determination is made as to whether the vehicle can traverse the road ahead based on a comparison between the width of the free space at each of the plurality of positions over the predetermined distance and a predetermined width of the vehicle.

23 Claims, 6 Drawing Sheets

(51) Int. Cl.
  *G06T 7/62* (2017.01)
  *B60R 1/00* (2006.01)
  *B60R 11/04* (2006.01)
  *G06K 9/00* (2006.01)

(52) U.S. Cl.
  CPC ............... *G06T 2207/10028* (2013.01); *G06T 2207/30236* (2013.01); *G06T 2207/30256* (2013.01); *G06T 2207/30261* (2013.01)

(56) References Cited

U.S. PATENT DOCUMENTS

| | | | | |
|---|---|---|---|---|
| 2013/0321627 | A1* | 12/2013 | Turn, Jr. ............... | B60W 30/00 |
| | | | | 348/148 |
| 2013/0345944 | A1* | 12/2013 | Kasiraj ............... | B60W 30/162 |
| | | | | 701/96 |
| 2015/0228187 | A1* | 8/2015 | Sebastian ........... | G01C 21/3415 |
| | | | | 701/117 |
| 2015/0336547 | A1* | 11/2015 | Dagan ...................... | B60T 7/22 |
| | | | | 701/70 |
| 2018/0164832 | A1* | 6/2018 | You ...................... | B60W 50/14 |
| 2019/0272435 | A1* | 9/2019 | Kundu ............... | G06K 9/00798 |

* cited by examiner

METHOD AND SYSTEM FOR DETERMINING WHETHER VEHICLE CAN ENTER ROAD

CROSS REFERENCE TO RELATED APPLICATION

This application claims priority from Korean Patent Application No. 10-2017-0095272, filed on Jul. 27, 2017, which is hereby incorporated by reference for all purposes as if fully set forth herein.

BACKGROUND OF THE INVENTION

1. Field of the Invention

The present disclosure relates to a method and a system for determining whether a vehicle can enter a road. Particularly, the present disclosure relates to a method and a system for determining whether a vehicle can enter a road by calculating the width of a free space on a road having a large number of obstacles, such as an alley, for helping driving when the road is accessible, and for providing an alternative route when the road is not accessible.

2. Description of the Prior Art

Advanced Driver Assistance Systems (ADASs) for vehicles have been drawing attention in recent years. ADASs are used for various purposes, for example, detecting an object around a vehicle using a sensor, such as a camera or radar, avoiding a collision with an object not recognized by a driver, or performing automatic parking by detecting an empty space.

However, conventional ADASs mostly focus on judgments pertaining to car-only roads having lanes and thus have difficulty making judgments on roads without lanes or alleys with many obstructions. When driving on a road having no lanes or many obstructions, it is important to determine whether a vehicle can enter the road because there are many obstructions on the road.

Therefore, there is a need for a method and a system that can determine whether a vehicle can enter a narrow road, such as an alley, using an ADAS.

SUMMARY OF THE INVENTION

To solve the foregoing problem of the prior art, an aspect of the present disclosure is to provide a method and a system for determining whether a vehicle can enter a road.

Another aspect of the present disclosure is to provide a method and a system for proposing an alternative route when it is determined that a vehicle cannot enter a road.

To achieve the foregoing aspects, a method for determining whether a vehicle can enter a road according to an embodiment of the present disclosure includes: detecting a left road edge, a right road edge, an obstacle, and a free space on a road ahead using a camera and radar installed so as to be oriented forwards in the vehicle; calculating the width of the free space; determining whether the vehicle can enter the road ahead based on a comparison between the width of the free space and a predetermined width of the vehicle; and displaying, on a display, an image in which a captured image of the road ahead and a virtual vehicle are composed when it is determined that the vehicle can enter the road ahead.

A system for determining whether a vehicle can enter a road according to an embodiment of the present disclosure includes: a camera configured to be installed so as to be oriented forwards in the vehicle; radar configured to be installed so as to be oriented forwards in the vehicle; a display; and a processor, wherein the processor is configured to detect a left road edge, a right road edge, an obstacle, and a free space on a road ahead by controlling the camera and the radar; calculate the width of the free space; determine whether the vehicle can enter the road ahead based on a comparison between the width of the free space and a predetermined width of the vehicle; and control the display to display an image in which a captured image of the road ahead and a virtual vehicle are composed when it is determined that the vehicle can enter the road ahead.

According to the present disclosure described above, it is possible to determine whether a vehicle can enter a particular road, thereby preventing a car accident that may occur on a narrow road.

Further, according to the present disclosure, when it is determined that a vehicle can enter a road, it is possible to display a virtual vehicle on a screen, thereby helping driving.

In addition, according to the present disclosure, when it is determined that a vehicle cannot enter a road, it is possible to propose an alternative route, thereby setting a route for a driver to safely drive.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Hereinafter, embodiments of the present disclosure will be described in detail with reference to the accompanying drawings so that the inventive concept may be readily implemented by those skilled in the art. However, it is to be noted that the present disclosure is not limited to the embodiments illustrated herein but can be realized in various other ways.

As described in the present specification, a road for which a determination is made as to whether a vehicle can enter the road is a narrow road having no clearly demarcated lanes or with a certain width or less. For the convenience of explanation, the following description will be made with reference to a road having no lanes. However, the present disclosure may be equally applied to a road having no lanes or a narrow road having a certain width or less and thus is not limited to the presence or absence of lanes.

Figure 1:
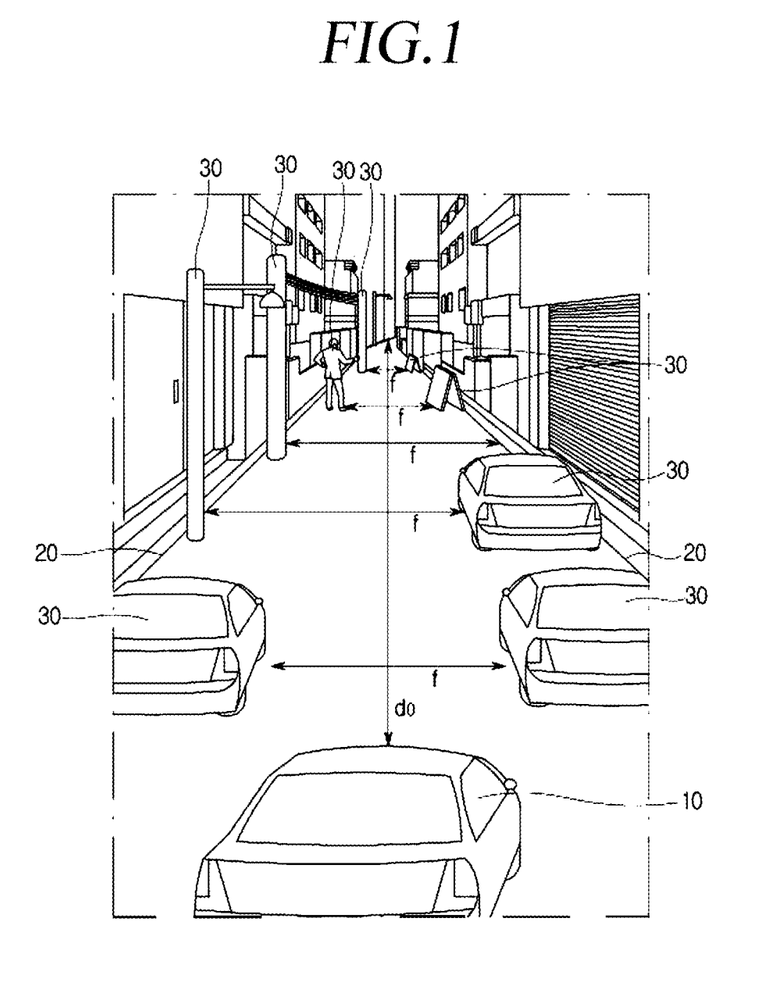
FIG. 1 shows an example of a road to which the present disclosure is applied.

FIG. 1 shows an example of a road to which the present disclosure is applied.

When a vehicle 10 enters a road having no lanes or a road having a narrow width, such as an alley, the vehicle generally encounters many obstacles 30 because there is no separate sidewalk and the road is not divided by lanes. A free space refers to a space through which a vehicle can travel. The width (f) of the free space needs to be wider than the width of the vehicle 10 so that the vehicle 10 can enter the free space.

The boundaries of a road may be defined by right and left road edges 20. In determining whether a vehicle can enter the free space, the maximum width of the free space is the distance between the road edges 20.

The obstacles 30 include any elements that may interrupt the vehicle 10 entering the road, such as a streetlamp, a telephone pole, a sign, a standing signboard, a pedestrian, and a parked car. The obstacles occupy space between the road edges 20, thereby reducing the width of the free space. Generally, a camera used for an Advanced Driver Assistance System (ADAS) may separately determine an object detected from a captured image, that is, the obstacles 30, according to the category thereof, for example, as a pedestrian, a streetlamp, or a car. In the present disclosure, however, any elements that may interrupt the vehicle 10 entering the road are collectively determined only as obstacles 30, regardless of the type thereof.

Whether the vehicle 10 can enter the road needs to be determined depending on whether the width (f) of the free space is wider than the width of the vehicle 10. Further, since the vehicle 10 enters the road in order to travel forwards along the road, not a short-distance free space but a long-distance free space needs to be secured on the road. Therefore, whether the vehicle 10 can enter the road needs to be determined depending on whether the width (f) of the free space is wider than the width of the vehicle 10 over a predetermined distance (d0) from the front of the vehicle.

Figure 2:
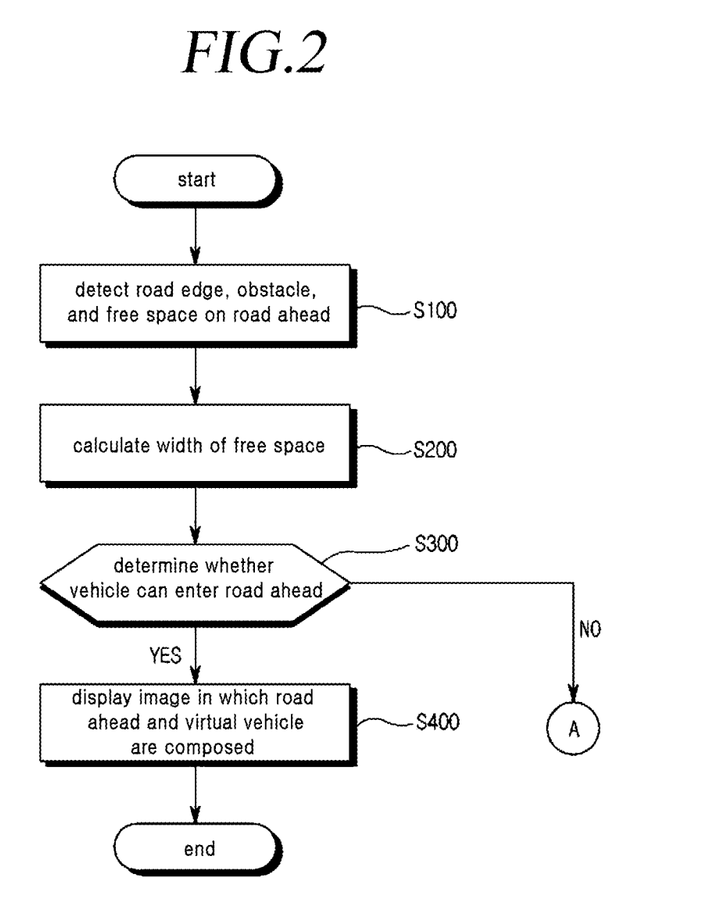
FIGS. 2 and 3 illustrate a method for determining whether a vehicle can enter a road according to one embodiment of the present disclosure.
Figure 3:
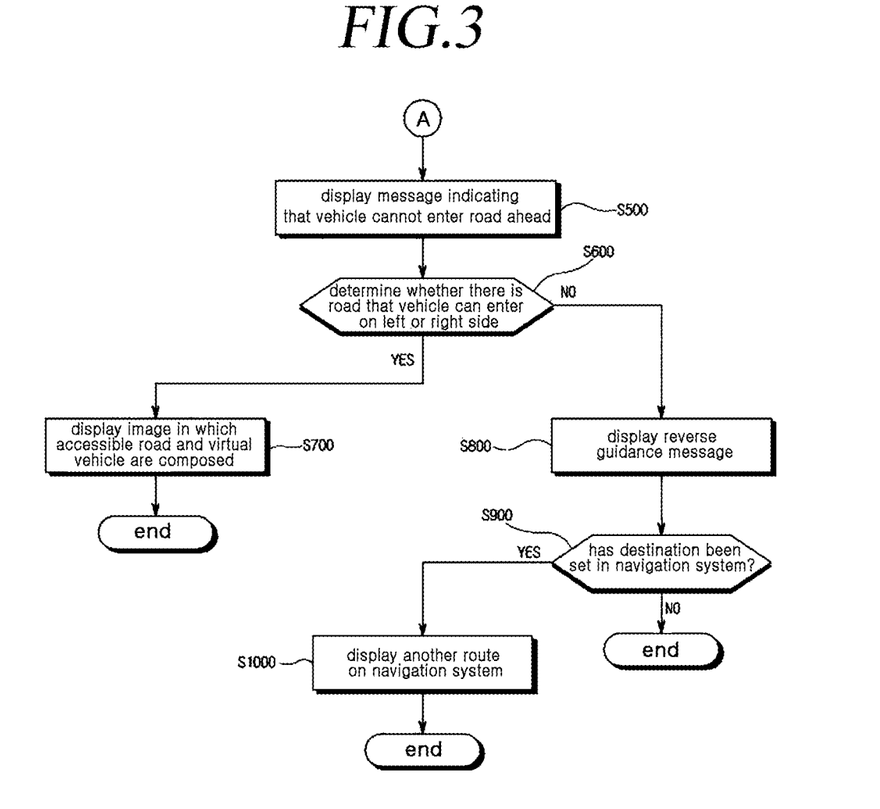

FIGS. 2 and 3 illustrate a method for determining whether a vehicle can enter a road according to one embodiment of the present disclosure.

The embodiment of the present disclosure may preferably be implemented only when the current speed of the vehicle is a predetermined speed or less. This is because a predetermined time needs to be secured so that a camera and radar accurately recognize an object and a processor presents an accurate determination result in real time in accordance with the driving conditions of the vehicle on the basis of a recognition result. Considering the performance of the camera, the radar, and the processor, the predetermined speed may be preferably set to 40 km/h.

According to the embodiment of the present disclosure, first, a road edge 20, an obstacle 30, and a free space are detected on a road ahead of a vehicle 10, which the vehicle 10 is to enter (S100). The vehicle 10 includes a camera and radar installed so as to be oriented forwards in the vehicle 10. In addition, operation S100 is performed using the camera and the radar installed so as to be oriented forwards in the vehicle 10.

The camera and the radar complement each other so as to accurately detect any obstacles on the road ahead of the vehicle 10. The camera can relatively accurately recognize an object in a transverse direction and can specifically recognize the type of object that the obstacle 30 is, that is, the category thereof, for example, pedestrian, streetlamp, or car. However, the camera cannot accurately recognize an object when light is strong or when light is distorted by rain. The radar can relatively accurately recognize the presence of an object in the longitudinal direction of the vehicle and can recognize the presence of an object even if the camera cannot accurately recognize the situation due to the distortion of light. For example, when snow is piled up in the corner of a road having no lanes, as illustrated in FIG. 1, the camera may mistake the snow as light and thus as free space, while the radar can recognize the snow as an object.

In addition, the radar and the camera may be sequentially used to calculate the width of the free space. For example, the presence or absence of an obstacle on the road ahead is determined using a radar sensor of the vehicle 10. The radar may accurately detect the presence of an obstacle even over a long distance.

When it is determined that there is an obstacle on the road ahead, edge information on the obstacle may be extracted using a captured image obtained by the camera. However, when it is determined that there is no obstacle on the road ahead, edge information on the road, rather than on an obstacle, may be extracted through the camera.

The extracted edge information may be used to calculate the width of the free space on the road ahead. That is, the radar and the camera are complementarily or cooperatively used to calculate the free space on the road.

After detecting the road edge 2, the obstacle 30, and the free space on the road ahead in operation S100, the width (f) of the free space is calculated on the basis of the result of detection (S200). The detailed method for calculating the width (f) of the free space will be described below with reference to FIGS. 4 and 5.

After calculating the width (f) of the free space, it is determined whether the vehicle 10 can enter the road ahead (S300). Specifically, when the width (f) of the free space is at a predetermined ratio or higher relative to the width of the vehicle 10, it is determined that the vehicle 10 can enter the road ahead. Preferably, considering the risk of a bump, when the width (f) of the free space is 120% or more of the width of the vehicle 10, it may be determined that the vehicle 10 can enter the road ahead. Preferably, the width of the vehicle 10 is a fixed value according to the model of the vehicle 10 and thus may be predetermined.

Alternatively, when the width (f) of the free space is a set threshold value or greater, it may be determined that the vehicle 10 can enter the road ahead. Here, the threshold value may be a preset value according to the vehicle type. Alternatively, the threshold value may be a dynamic value that is determined on the basis of at least one of total mileage information on the vehicle, narrow-road mileage information pertaining to driving on roads having a preset width or less, and level input information.

For example, using the total mileage information on the vehicle and preset threshold value information on each section, threshold value information on a section including the total mileage information on the vehicle may be applied as the set threshold value.

In another example, using the narrow-road mileage information on the vehicle driving on the road having the preset width or less and preset threshold value information on each section, threshold value information on a section including total narrow-road mileage information on the vehicle may be applied as the set threshold value.

In still another example, any one of a plurality of threshold values may be applied as the set threshold value according to level input information input by a driver.

That is, the threshold value may be dynamically determined depending on the driving skill of a driver. Accordingly, when the driver has accumulated a long lifetime driving distance, has extensive experience driving on narrow roads, or makes a request therefor, the threshold value may be reduced, thereby improving convenience.

Therefore, the minimum value of threshold information may be set to the width of the vehicle or greater, and a plurality of threshold tables in which the threshold value increases at regular intervals or at a constant rate may be stored.

Preferably, when the width (f) of any free space is at the predetermined ratio or higher relative to the width of the vehicle 10 or is the set threshold value or greater over a predetermined distance (d0) from the front of the vehicle 10, it may be determined that the vehicle 10 can enter the road ahead. That is, when the width (f) of the free space is less than the predetermined ratio relative to the width of the vehicle 10 or is less than the threshold value partly over the predetermined distance (d0), it may be determined that the vehicle 10 cannot enter the road ahead.

Although the measurement range of the radar is longer than the measurement range of the camera, the two types of sensors need to be used in combination, and thus it is preferable that the predetermined distance (d0) be set to the measurement range of the camera. Therefore, the predetermined distance (d0) may be set to 50 m considering the measurement range of the camera.

When it is determined that the vehicle 10 can enter the road ahead, an image in which a captured image of the road ahead and a virtual vehicle are composed is displayed on a display (S400). Displaying the image with the virtual vehicle composed therein serves to help driving by displaying the traveling path of the vehicle. The virtual vehicle may be composed with the captured image of the road ahead such that the virtual vehicle is located forward by a predetermined distance from the current position of the vehicle 10. The predetermined distance may be set to a distance forward from the current position of the vehicle 10 in consideration of the speed of the vehicle 10. Preferably, the predetermined distance may be set to 8 to 10 m.

When it is determined that the vehicle 10 cannot enter the road ahead, a message indicating that the vehicle 10 cannot enter the road ahead or a reverse guidance message is displayed on the display (S500). Preferably, a pop-up message asking whether to receive guidance on an alternative road may also be displayed on the display. When the pop-up message asking whether to receive the guidance on the alternative road is displayed, the subsequent operation is performed only when a user chooses to receive the guidance on the alternative road.

After displaying the message indicating that the vehicle 10 cannot enter the road ahead, when the pop-up message asking whether to receive the guidance on the alternative road is not displayed or when the pop-up message asking whether to receive the guidance on the alternative road is displayed and the user chooses to receive the guidance on the alternative road, it is determined whether there is a road that the vehicle 10 can enter on the left or right side of the vehicle 10 (S600).

Operation S600 of determining whether there is a road that the vehicle 10 can enter on the left or right side of the vehicle 10 is performed in the same manner as operation S300 of determining whether the vehicle 10 can enter the road ahead. To perform operation S600, the vehicle 10 further includes a camera and radar installed so as to be oriented leftwards in the vehicle 10 and a camera and radar installed so as to be oriented rightwards in the vehicle 10, in addition to the camera and the radar installed so as to be oriented forwards in the vehicle 10. Operation S600 is performed using the camera and the radar installed so as to be oriented leftwards in the vehicle 10 and the camera and the radar installed so as to be oriented rightwards in the vehicle 10.

Specifically, in operation S600, a road edge, an obstacle, and a free space are detected on the left and right sides of the vehicle 10, the width of the free space is calculated, and it is determined whether the vehicle 10 can enter the road on the basis of whether the width of the free space is at the predetermined ratio or higher relative to the width of the vehicle 10 or is the set threshold value or greater. When there is a road that the vehicle 10 can enter on the left or right side of the vehicle 10 and thus a road edge, an obstacle, and a free space are detected and when the width of the free space is at the predetermined ratio or higher relative to the width of the vehicle 10 or is the set threshold value or greater, it is determined that there is a road that the vehicle 10 can enter on the left or right side of the vehicle 10. Further, when there is no road that the vehicle 10 can enter on the left or right side of the vehicle 10 and thus a road edge, an obstacle, and a free space are not detected or when a road edge, an obstacle, and a free space are detected but the width of the free space is less than the predetermined ratio relative to the width of the vehicle 10 or is less than the set threshold value, it is determined that there is no road that the vehicle 10 can enter on the left or right side of the vehicle 10.

When it is determined that there is a road that the vehicle 10 can enter on the left or right side of the vehicle 10, an image in which a captured image of the road that the vehicle 10 can enter on the left or right side of the vehicle 10 and a virtual vehicle are composed is displayed on the display (S700). Displaying the image with the virtual vehicle composed therein serves to help driving by displaying the traveling path of the vehicle. The virtual vehicle may be composed with the captured image of the road that the vehicle 10 can enter on the left or right side such that the virtual vehicle is located leftwards or rightwards by a predetermined distance from the current position of the vehicle 10. The predetermined distance may be set to a distance leftwards or rightwards from the current position of the vehicle 10 at which the vehicle 10 will soon arrive. Preferably, the predetermined distance may be set to 8 to 10 m.

When it is determined that there is no road that the vehicle 10 can enter on the left or right side of the vehicle 10, the vehicle 10 displays a reverse guidance message on the display (S800). Further, it is determined whether a driver has set a destination in a navigation system (S900). When it is determined that the driver has set a destination, a navigation image of another route to the destination is displayed on the display (S1000).

In the foregoing method for determining whether the vehicle can enter the road, a corresponding function may be performed only under particular conditions.

For example, when the driver manipulates an input button to implement the function and thus the vehicle receives input information, an algorithm to determine whether the vehicle can enter the road may be activated.

Alternatively, when it is detected that the road ahead has a preset width or less on the basis of location information on the vehicle, an operation of detecting a free space on the road ahead may be performed.

For example, in an operation of detecting the width of a free space, the location information on the vehicle may be detected using navigation information or GPS information, and a road edge, an obstacle, and a free space may be detected using the radar and the camera when the road on which the vehicle is traveling and the road ahead on which the vehicle is to travel have the preset width or less.

The width of the road may be pre-stored in the navigation system or the like or may be received from a server through the navigation system. For example, a legal road width required for an expressway is different from a legal road width required for a one-way road. Accordingly, information on a legal road width for the road on which the vehicle is traveling or for the road ahead on which the vehicle is to travel may be identified through the navigation system, and the foregoing function may be activated only when the legal road width is the preset width or less.

Figure 4:
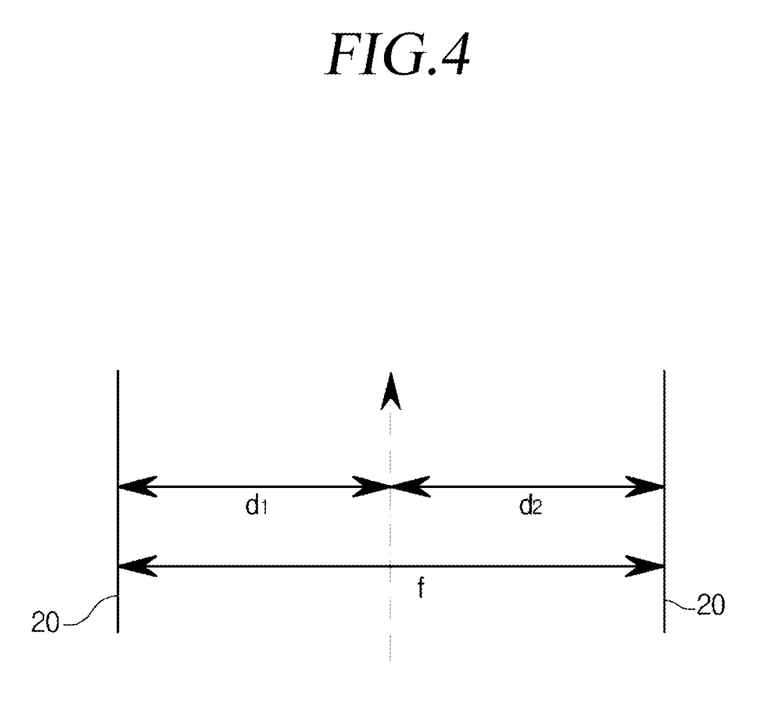
FIGS. 4 and 5 illustrate a method for calculating the width of a free space according to one embodiment of the present disclosure.
Figure 5:
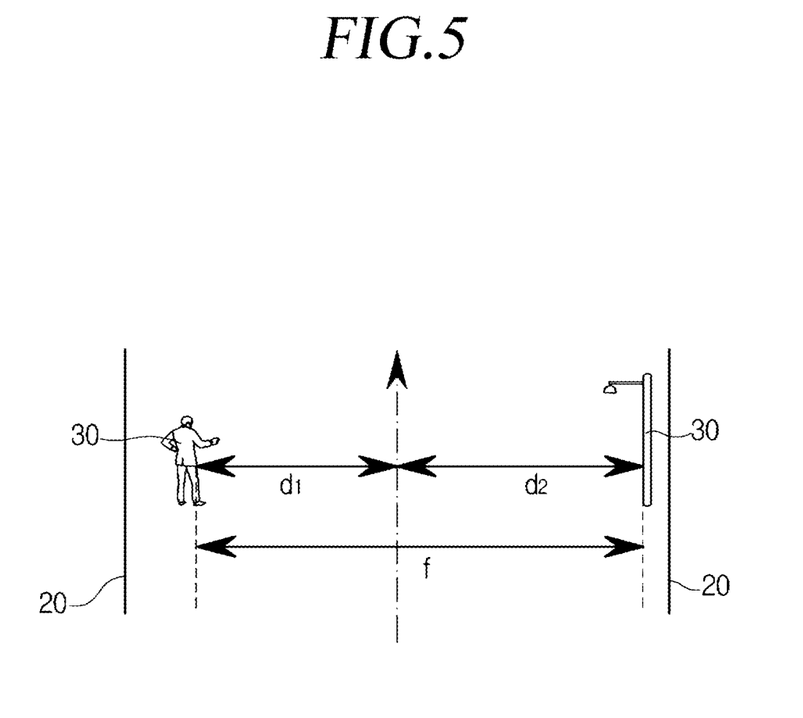

FIGS. 4 and 5 illustrate a method for calculating the width of a free space according to one embodiment of the present disclosure.

FIG. 4 illustrates a method for calculating the width (f) of a free space when there is no obstacle on a road, and FIG. 5 illustrates a method for calculating the width (f) of a free space when there is an obstacle on a road.

Referring to FIG. 4, when there is no obstacle 30 on the road, the camera recognizes only that road edges 20 are present. Therefore, the distance (d1) from the center of the camera to the left road edge 20 and the distance (d2) from the center of the camera to the right road edge may be obtained using the camera. The width (f) of the free space may be calculated from the sum of d1 and d2.

Referring to FIG. 5, when there are obstacles on the road, the camera recognizes the obstacles 30 together with the road edges 20. However, the width (f) of the free space is reduced due to the presence of the obstacles 30, compared to FIG. 4, and thus the presence of the obstacles needs to be taken into account when the width (f) of the free space is calculated. Accordingly, the distance (d1) from the center of the camera to the left obstacle 30 and the distance (d2) from the center of the camera to the right obstacle 30 may be obtained using the camera. The width (f) of the free space may be calculated from the sum of d1 and d2.

The center of the camera mentioned above is used in the same sense as the center of the captured image taken by the camera and may be interchangeable with the center of the captured image.

Figure 6:
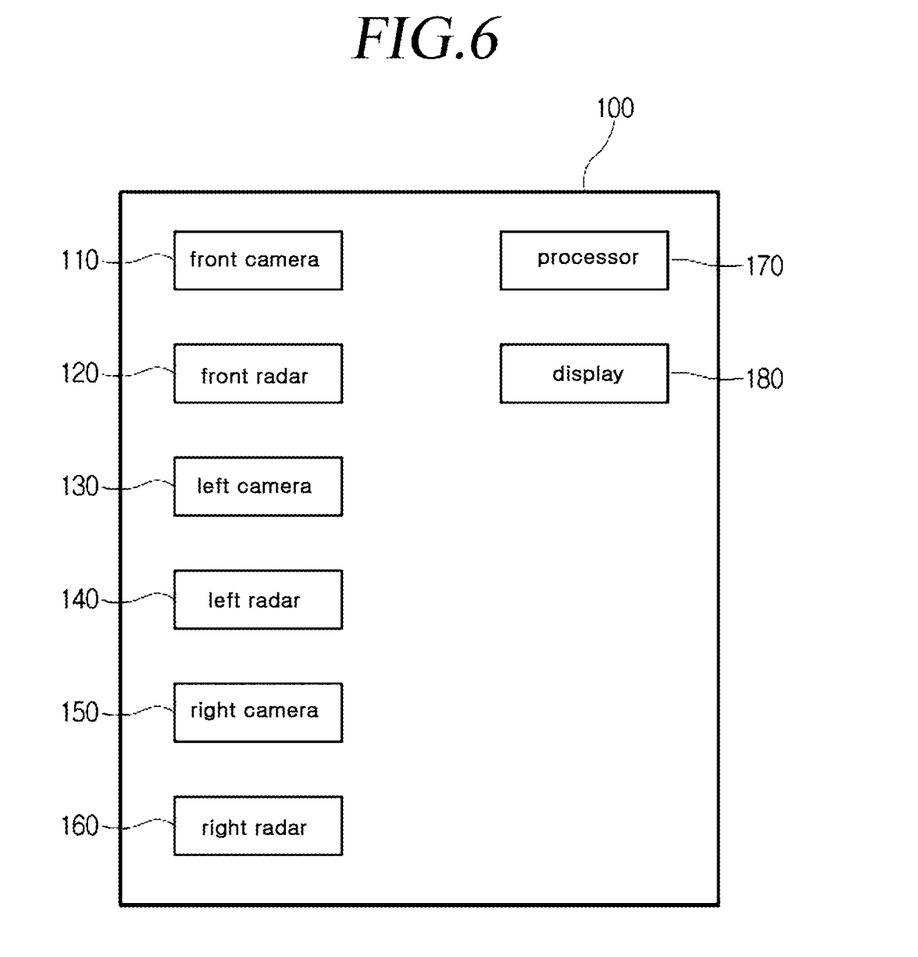
FIG. 6 illustrates a system for determining whether a vehicle can enter a road according to one embodiment of the present disclosure.

FIG. 6 illustrates a system for determining whether a vehicle can enter a road according to one embodiment of the present disclosure.

The system 100 for determining whether the vehicle can enter the road includes a camera 110 installed so as to be oriented forwards, radar 120 installed so as to be oriented forwards, a camera 130 installed so as to be oriented leftwards, radar 140 installed so as to be oriented leftwards, a camera 150 installed so as to be oriented rightwards, radar 160 installed so as to be oriented rightwards, a processor 170, and a display 180. The processor 170 may be configured to control the components 110 to 160 and 180, thereby implementing the procedures and/or methods proposed in the present disclosure.

The processor 170 of the present disclosure may also be referred to as a controller, a microcontroller, a microprocessor, a microcomputer, or the like. The processor 170 may be implemented by hardware, firmware, software, or a combination thereof.

When the embodiments of the present disclosure are implemented using hardware, Application-Specific Integrated Circuits (ASICs), Digital Signal Processors (DSPs), Digital Signal Processing Devices (DSPDs), Programmable Logic Devices (PLDs), Field-Programmable Gate Arrays (FPGAs), and the like may be provided in the processor 170.

The embodiments described above are achieved through combination of elements and features of the present disclosure in a predetermined form. Each element or feature should be considered optional unless specified otherwise. Each element or feature may be carried out without being combined with other elements or features. It is also possible to construct the embodiments of the present disclosure by combining some of the elements and/or features. The order of operations described in the embodiments of the present disclosure may be changed. Some elements or features of one embodiment may be included in another embodiment or may be replaced with corresponding elements or features of another embodiment. It is clear that embodiments may be configured by combining claims that do not have an explicit citation relationship therebetween, or that new claims may be added by an amendment after the application.

It will be apparent to those skilled in the art that the present disclosure can be embodied in other forms without departing from the spirit or essential characteristics of the present disclosure. Accordingly, the above embodiments are to be considered not restrictive but illustrative in all aspects. The scope of the present disclosure should be determined by reasonable interpretation of the appended claims and all possible variations within the scope of equivalents to the present disclosure.

What is claimed is:

1. A method for guiding a vehicle based on an open width of a roadway, the method comprising:
   detecting, based on at least one of image data or radar sensing data received respectively from at least one of an image sensor or a radar mounted to the vehicle and oriented forward of the vehicle, a left roadway edge, a right roadway edge, and at least one obstacle in the roadway ahead of the vehicle;
   determining, using a processor communicatively connected to at least one of the image sensor or the radar mounted to the vehicle, width of free space at a plurality of positions over a predetermined distance from a front of the vehicle, based on the detected positions of the left roadway edge, the right roadway edge, and the at least one obstacle;
   determining, using the processor, whether the vehicle can traverse the roadway ahead over the predetermined distance from the front of the vehicle based on a comparison between a width of free space at each of the plurality of positions over the predetermined distance and a sum of a predetermined width of the vehicle and an adjustable threshold value; and
   routing the vehicle along the roadway ahead or an alternate route that does not traverse the roadway based on the determining whether the vehicle can traverse the roadway ahead.

2. The method of claim 1, wherein the image data is captured by a camera comprising the image sensor, and the width of free space is determined, at each of the plurality of positions over the predetermined distance from the front of the vehicle, by adding a distance from a center of the camera to the left roadway edge or an obstacle located leftwards from the center of the camera and a distance from the center of the camera to the right roadway edge or an obstacle located rightwards from the center of the camera.

3. The method of claim 1, wherein the vehicle is determined to be able to traverse the roadway when the width of free space is larger than the sum of the predetermined width of the vehicle and the threshold value set relative to the width of the vehicle.

4. The method of claim 1, wherein the adjustable threshold value is determined based on at least one of total mileage information of the vehicle, narrow-road mileage information on total mileage driven by the vehicle on roads having a preset width or less, or driver information.

5. The method of claim 1, wherein the detecting includes detecting the left roadway edge, the right roadway edge, the at least one obstacle, and free space on the roadway ahead of the vehicle when the roadway ahead is determined, based on location information on the vehicle, to have a preset width or less.

6. The method of claim 1, further comprising:
displaying, on a display mounted in the vehicle, a composite image including an image that is captured by an image sensor mounted to the vehicle and that includes the roadway ahead, and a virtual vehicle, in response to determining that the vehicle can traverse the roadway ahead.

7. The method of claim 1, further comprising:
displaying, on a display mounted in the vehicle, a message indicating that the vehicle cannot traverse the roadway ahead in response to determining that the vehicle cannot traverse the roadway ahead; and
identifying a side road serving as the alternate route that the vehicle is capable of traversing using the image sensor and the radar and another image sensor and another radar mounted to the vehicle and oriented to a side of the vehicle.

8. The method of claim 7, further comprising:
displaying, on the display, a composite image including an image that is captured by an image sensor mounted to the vehicle and that includes the side road that the vehicle is capable of traversing, and a virtual vehicle, in response to identifying the side road that the vehicle can traverse.

9. The method of claim 1, further comprising:
displaying, on a display mounted in the vehicle, a reverse guidance message in response to determining that the vehicle cannot traverse the roadway ahead; and
displaying, on the display, a navigation image of the alternate route to a destination when the destination is set in a navigation system.

10. The method of claim 1, wherein the step of detecting includes detecting the width of free space by sensing whether the at least one obstacle exists using the radar sensing data, extracting edge information on the at least one obstacle using the image data when the at least one obstacle is sensed, and extracting edge information on the roadway using the image data.

11. A system for guiding a vehicle based on an open width of a roadway, the system comprising:
an image sensor configured to be mounted to the vehicle so as to be oriented forward of the vehicle;
a radar configured to be mounted to the vehicle so as to be oriented forward of the vehicle;
a display mounted to the vehicle; and
a processor communicatively connected to the image sensor, the radar, and the display and configured to:
detect a left roadway edge, a right roadway edge, and at least one obstacle in the roadway ahead of the vehicle based on image data and radar sensing data received from the image sensor and the radar;
determine width of free space at a plurality of positions over a predetermined distance from a front of the vehicle, based on the detected positions of the left roadway edge, the right roadway edge, and the at least one obstacle; and
determine whether the vehicle can traverse the roadway ahead over the predetermined distance from the front of the vehicle based on a comparison between a width of free space at each of the plurality of positions over the predetermined distance and a sum of a predetermined width of the vehicle and an adjustable threshold value.

12. The system of claim 11, wherein the system comprises a camera including the image sensor, and the processor is configured to determine the width of free space at each of the plurality of positions over the predetermined distance from the front of the vehicle by adding a distance from a center of the camera to the left roadway edge or an obstacle located leftwards from the center of the camera and a distance from the center of the camera to the right roadway edge or an obstacle located rightwards from the center of the camera.

13. The system of claim 11, wherein the processor determines that the vehicle is capable of traversing the roadway when the width free space at each of the plurality of positions is larger than the sum of the predetermined width of the vehicle and the threshold value set relative to the width of the vehicle.

14. The system of claim 11, wherein the adjustable threshold value is determined based on at least one of total mileage information of the vehicle, narrow-road mileage information on total mileage driven by the vehicle on roads having a preset width or less, or driver information.

15. The system of claim 11, further comprising:
a left camera and a left radar configured to be mounted to the vehicle to be oriented leftwards of the vehicle; and
a right camera and a right radar configured to be mounted to the vehicle to be oriented rightwards of the vehicle,
wherein when the processor determines that the vehicle cannot traverse the roadway ahead, the processor is further configured to:
control the display to display a message indicating that the vehicle cannot traverse the roadway ahead; and
identify an alternate road that the vehicle is capable of traversing on a left or right side of the vehicle using sensing data from the left or right camera and the left or right radar.

16. The system of claim 15, wherein when it is determined that the vehicle is not capable of traversing the roadway ahead, the processor is further configured to:
control the display to display a composite image including an image that is captured by the left camera or the right camera mounted to the vehicle and that includes the alternate road that the vehicle is capable of traversing on the left or right side of the vehicle, and a virtual vehicle, when the alternate road is identified.

17. The system of claim 11, wherein the processor is configured to detect free space by sensing whether at least one obstacle exists using the radar sensing data, extract edge information on the at least one obstacle using the image data received from the image sensor when the at least one obstacle is sensed, and extract edge information on the roadway using the image data received from the image sensor.

18. The system of claim 11, wherein the processor is configured to:
control the display to display an image in which a captured image of the roadway ahead and a virtual vehicle are composed when it is determined that the vehicle is capable of traversing the roadway ahead.

19. A method for guiding a vehicle based on an open width of a road, the method comprising:

detecting, based on image data and radar sensing data received from an image sensor and a radar mounted to the vehicle and oriented forward of the vehicle, a left road edge, a right road edge, and an obstacle in the road ahead;

determining, using a processor communicatively connected to the image sensor and radar mounted to the vehicle, a width of free space based on detected positions of the left road edge, the right road edge, and the obstacle;

determining, using the processor, whether the vehicle can traverse the road ahead based on a comparison between the width of the free space and a predetermined width of the vehicle; and displaying, on a display communicatively connected to the processor, an image including a route for the vehicle based on the determination whether the vehicle can traverse the road ahead, wherein the displaying comprises displaying an image captured by the image sensor mounted to the vehicle and including the roadway ahead and the route for the vehicle in response to determining that the width of the free space is larger than a predetermined width.

20. The method of claim 19, wherein the displaying comprises displaying a side road serving as an alternate route that the vehicle is capable of traversing in response to determining that the width of the free space is smaller than a predetermined width.

21. The method of claim 20, wherein the displaying comprises displaying a composite image, including both an image of the side road captured by an image sensor mounted to the vehicle and an image of the route for the vehicle on the side road, in response to determining that the width of the free space in the road ahead is smaller than a predetermined width.

22. The method of claim 19, wherein the displaying comprises displaying a composed image including both the image captured by the image sensor mounted to the vehicle and the route for the vehicle in response to determining that the width of the free space is larger than a predetermined width.

23. The method of claim 19, further comprising routing the vehicle along the roadway ahead or an alternate route that does not traverse the roadway based on the determining whether the vehicle can traverse the roadway ahead.

* * * * *